United States Patent
Kan

(10) Patent No.: US 9,647,707 B1
(45) Date of Patent: May 9, 2017

(54) SIGNAL RECEIVER

(71) Applicant: Rafael Microelectronics, Inc., Hsinchu County (TW)

(72) Inventor: Meng-Ping Kan, Hsinchu (TW)

(73) Assignee: RAFAEL MICROELECTRONICS, INC., Hsinchu (TW)

( * ) Notice: Subject to any disclaimer, the term of this patent is extended or adjusted under 35 U.S.C. 154(b) by 0 days.

(21) Appl. No.: 15/235,129

(22) Filed: Aug. 12, 2016

(51) Int. Cl.
*H04B 1/10* (2006.01)
*H04B 1/08* (2006.01)
*H04B 7/185* (2006.01)

(52) U.S. Cl.
CPC ............. *H04B 1/1036* (2013.01); *H04B 1/08* (2013.01); *H04B 7/18517* (2013.01); *H04B 7/18523* (2013.01); *H04B 2001/1045* (2013.01)

(58) Field of Classification Search
CPC .......... H04B 1/10; H04B 1/1036; H04B 1/08; H04B 7/18; H04B 7/18517; H04B 7/18523; H04B 2001/1045; H04B 1/12; H04B 7/185; H03F 3/45; H03F 3/19; H03F 2200/294; H03F 2200/405; H03F 2200/408; H03F 2200/411; H03F 2200/414; H03F 2203/21142; H03F 2203/21175; H03F 2203/7221; H03F 2203/7236
See application file for complete search history.

(56) References Cited

U.S. PATENT DOCUMENTS

| | | | | |
|---|---|---|---|---|
| 6,405,018 B1* | 6/2002 | Reudink | .................. | H04B 7/04 455/20 |
| 6,498,582 B1* | 12/2002 | Sweeney | ............... | G01S 7/4021 342/149 |
| 8,023,912 B2* | 9/2011 | Petrovic | .................. | H04B 1/28 455/323 |
| 8,638,839 B2* | 1/2014 | Negus | ...................... | H04B 1/38 370/210 |
| 9,166,638 B2* | 10/2015 | Kan | ....................... | H04B 1/123 |
| 9,413,476 B2* | 8/2016 | Petrovic | ................... | H04B 1/28 |
| 9,548,778 B2* | 1/2017 | Bardy | .................... | H04B 1/006 |
| 2016/0036400 A1* | 2/2016 | Kan | ....................... | H04B 7/185 330/252 |
| 2016/0197660 A1* | 7/2016 | O'Keeffe | ............... | H01Q 1/246 370/329 |

* cited by examiner

*Primary Examiner* — Pablo Tran
(74) *Attorney, Agent, or Firm* — Min-Lee Teng; Litron Patent & Trademark Office

(57) ABSTRACT

A signal receiver includes a first mixer configured to mix its first input with its second input associated with an oscillating output of a first synthesizer into an output; a first splitter configured to split its input associated with the output of the first mixer into a first output and a second output; a first switch matrix configured to switch its first input associated with the first output of the first splitter into a first output; a second switch matrix configured to switch its first input associated with the second output of the first splitter into a first output; a second mixer configured to mix its first input associated with the first output of the first switch matrix with its second input associated with an oscillating output of a second synthesizer into an output; and a third mixer configured to mix its first input associated with the first output of the second switch matrix with its second input associated with an oscillating output of a third synthesizer into an output.

20 Claims, 11 Drawing Sheets

SIGNAL RECEIVER

BACKGROUND OF THE DISCLOSURE

Field of the Disclosure

The present invention relates generally to a signal receiver, and more particularly to a signal receiver configured to be set in an outdoor unit to receive a signal from one or more satellites in a field of view of the signal receiver.

Brief Description of the Related Art

Satellite television has become increasingly popular due to various contents. A satellite television system typically includes an antenna array configured to collect signals from satellites and a signal receiver containing amplifiers configured to amplify the collected signals, band-pass filters (BPF) configured to pass the collected signals at frequencies within a certain frequency range and to attenuate the collected signals at frequencies outside the frequency range, and mixers configured to convert the collected signals at radio frequencies into ones at intermediate frequencies. Thereby, the collected signals may be processed into optimum amplified signals in a base or intermediate frequency band so as to be demodulated in a set top box.

SUMMARY OF THE DISCLOSURE

The present invention provides a signal receiver configured to be set in an outdoor unit to receive a signal from one or more satellites in a field of view of the signal receiver such that the signal can be conditioned and split in the outdoor unit to be passed to multiple indoor units in respective families, and each of the indoor units may include a splitter to split the signal received from the signal receiver set in the outdoor unit to be demodulated by multiple setup boxes in said each of the indoor units.

The signal receiver includes a first synthesizer configured to generate an oscillating output; a first mixer configured to mix its first input with its second input associated with the oscillating output of the first synthesizer into an output; a first splitter configured to split its input associated with the output of the first mixer into a first output and a second output; a first switch matrix configured to switch its first input associated with the first output of the first splitter into a first output; a second switch matrix configured to switch its first input associated with the second output of the first splitter into a first output; a second synthesizer configured to generate an oscillating output; a second mixer configured to mix its first input associated with the first output of the first switch matrix with its second input associated with the oscillating output of the second synthesizer into an output; a third synthesizer configured to generate an oscillating output; and a third mixer configured to mix its first input associated with the first output of the second switch matrix with its second input associated with the oscillating output of the third synthesizer into an output.

A single integrated-circuit (IC) chip includes: a switch matrix configured to switch its first input into a first output and switch its second input into a second output; a first synthesizer configured to generate an oscillating output; a first mixer configured to mix its first input associated with the first output of the switch matrix with its second input associated with the output of the first synthesizer into an output; a second synthesizer configured to generate an oscillating output; a second mixer configured to mix its first input associated with the second output of the switch matrix with its second input associated with the oscillating output of the second synthesizer into an output; a first filter configured to suppress a component of its input associated with the output of the first mixer into an output; a second filter configured to suppress a component of its input associated with the output of the second mixer into an output; a third synthesizer configured to generate an oscillating output; a third mixer configured to mix its first input associated with the output of the first image rejection filter with its second input associated with the oscillating output of the third synthesizer into an output; a fourth synthesizer configured to generate an oscillating output; a fourth mixer configured to mix its first input associated with the output of the second image rejection filter with its second input associated with the oscillating output of the fourth synthesizer into an output; and a combiner configured to combine its first input associated with the output of the third mixer and its second input associated with the output of the fourth mixer into an output.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1A:
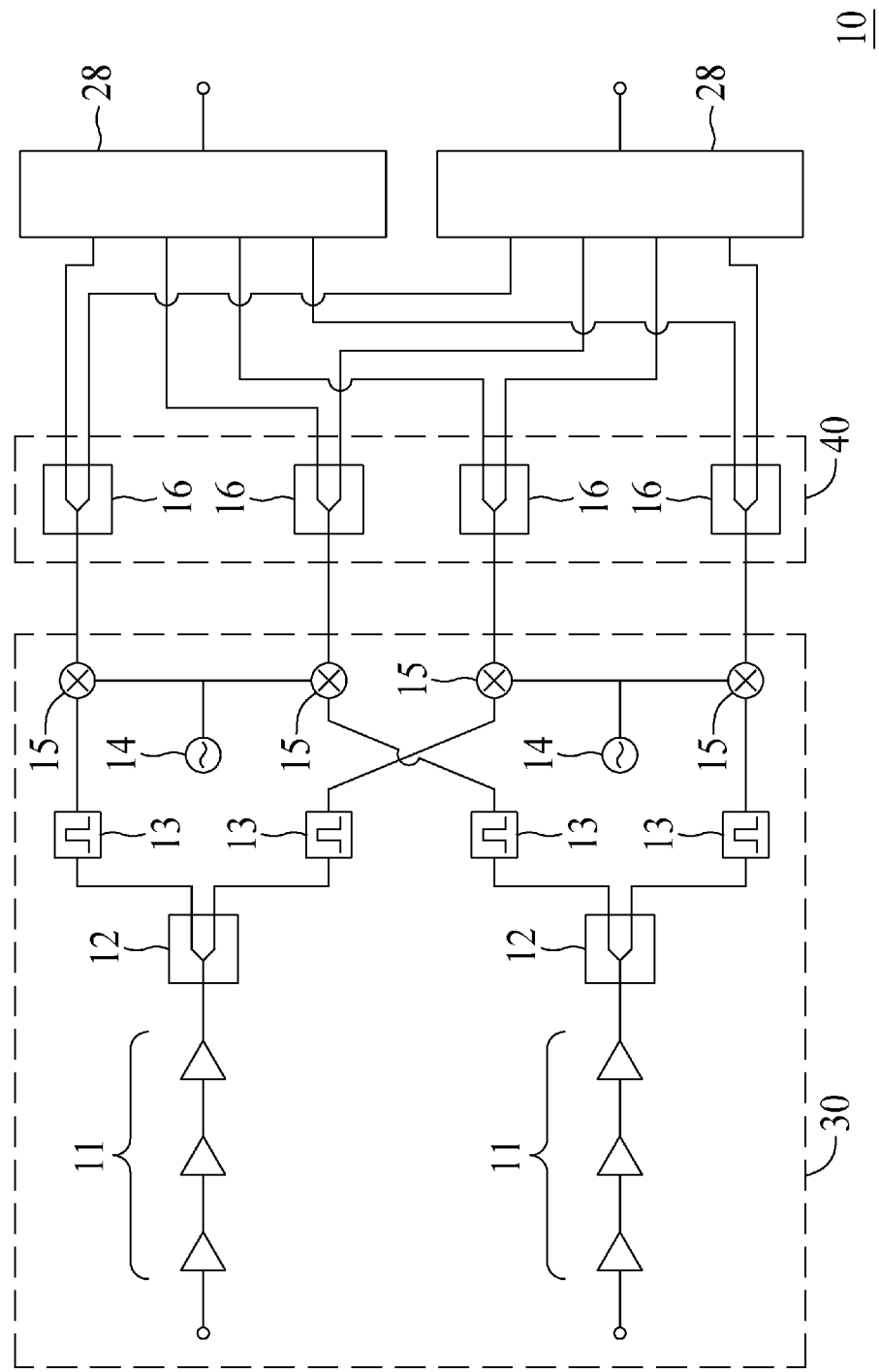
FIG. 1A illustrates a block diagram of a signal receiver in accordance with a first embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

First Embodiment

FIG. 1A illustrates a block diagram of a signal receiver in accordance with a first embodiment of the present invention. Referring to FIG. 1A, the signal receiver 10, such as low-noise block (LNB), is configured to be set in an outdoor unit to process vertically and horizontally polarized signals or right-hand and left-hand circularly polarized signals, collected by an antenna feed horn of the signal receiver 10 at a focal point of an antenna dish or reflector dish of the outdoor unit, from a satellite in a field of view of the signal receiver 10.

Referring to FIG. 1A, the signal receiver 10 may include two sets of multi-stage amplifiers 11 arranged in parallel, wherein each of the two sets of multi-stage amplifiers 11 includes multiple amplifiers coupled in series. Each of the amplifiers 11 in each set may be a low noise amplifier (LNA), for example, having its input to be amplified as an output of said each of the amplifiers 11. Accordingly, each of the two sets of multi-stage amplifiers 11 may have its input to be amplified stage by stage as an output of said each of the two sets of multi-stage amplifiers 11, and thus said each of the two sets of multi-stage amplifiers 11 has its output amplified with a low noise. The vertically polarized signal collected from the antenna feed horn may be transmitted to the input of a top one of the two sets of multi-stage amplifiers 11, and the horizontally polarized signal collected from the antenna feed horn may be transmitted to the input of a bottom one of the two sets of multi-stage amplifiers 11; alternatively, the right-hand circularly polarized signal collected from the antenna feed horn may be transmitted to the input of the top one of the two sets of multi-stage amplifiers 11, and the left-hand circularly polarized signal collected from the antenna feed horn may be transmitted to the input of the bottom one of the two sets of multi-stage amplifiers 11. The two sets of multi-stage amplifiers 11 may be two respective sets of three-stage amplifiers arranged in parallel, wherein each of the two sets of three-stage amplifiers includes three amplifiers coupled in series as shown in FIG. 1A. Alternatively, the two sets of multi-stage amplifiers 11 may be two respective sets of two-stage amplifiers arranged in parallel, wherein each of the two sets of two-stage amplifiers includes two amplifiers coupled in series. Alternatively, the two sets of multi-stage amplifiers 11 may be replaced with two respective sets of single-stage amplifier arranged in parallel.

Referring to FIG. 1A, the signal receiver 10 may include two splitters 12, i.e. power divider, arranged in parallel, wherein a top one of the two splitters 12 has its input coupled to the output of the top one of the two sets of multi-stage amplifiers 11 and a bottom one of the two splitters 12 has its input coupled to the output of the bottom one of the two sets of multi-stage amplifiers 11. Each of the two splitters 12 may split its input into two identities with substantially the same power at two respective outputs of said each of the splitters 12.

Referring to FIG. 1A, the signal receiver 10 may include four band-pass filters (BPF) 13 arranged in parallel, wherein top two of the four band-pass filters (BPF) 13 have their inputs coupled to the two respective outputs of the top one of the two splitters 12, and bottom two of the four band-pass filters (BPF) 13 have their inputs coupled to the two respective outputs of the bottom one of the two splitters 12. Each of the four band-pass filters (BPF) 13 may pass its input at frequencies within a certain frequency range and attenuate its input at frequencies outside the frequency range as an output of said each of the band-pass filters (BPF) 13.

Referring to FIG. 1A, the signal receiver 10 may include two synthesizers 14, i.e., local oscillators (LO), a top one of which may generate an oscillating output within a frequency range between 3.0 GHz and 20.0 GHz and preferably between 8.0 GHz and 12.0 GHz, such as 9.75 GHz and a bottom one of which may generate an oscillating output within a frequency range between 3.0 GHz and 20.0 GHz and preferably between 8.0 GHz and 12.0 GHz, such as 10.6 GHz. The oscillating output of the top one of the two synthesizers 14 may have a different frequency from that of the oscillating output of the bottom one of the two synthesizers 14.

Referring to FIG. 1A, the signal receiver 10 may include four mixers 15 arranged in parallel. A topmost one of the four mixers 15 may have its first input coupled to the output of a top one of the top two of the four band-pass filters (BPF) 13 and its second input coupled to the oscillating output of the top one of the two synthesizers 14 and mix its first and second inputs into an output. A second top one of the four mixers 15 may have its first input coupled to the output of a top one of the bottom two of the four band-pass filters (BPF) 13 and its second input coupled to the oscillating output of the top one of the two synthesizers 14 and mix its first and second inputs into an output. A second bottom one of the four mixers 15 may have its first input coupled to the output of a bottom one of the top two of the four band-pass filters (BPF) 13 and its second input coupled to the oscillating output of the bottom one of the two synthesizers 14 and mix its first and second inputs into an output. A bottommost one of the four mixers 15 may have its first input coupled to the output of a bottom one of the bottom two of the four band-pass filters (BPF) 13 and its second input coupled to the oscillating output of the bottom one of the two synthesizers 14 and mix its first and second inputs into an output. The two sets of multi-stage amplifiers 11, the two splitters 12, the four band-pass filters (BPF) 13, the two synthesizers 14 and the four mixers 15 may compose a radio-frequency (RF) module 30.

Referring to FIG. 1A, the signal receiver 10 may include a splitter matrix 40 having four splitters 16, i.e. power divider, arranged in parallel, wherein a topmost one of the four splitters 16 may have its input coupled to the output of the topmost one of the mixers 15, a second top one of the four splitters 16 may have its input coupled to the output of the second top one of the mixers 15, a second bottom one of the four splitters 16 may have its input coupled to the output of the second bottom one of the mixers 15 and a bottommost one of the four splitters 16 may have its input coupled to the output of the bottommost one of the mixers 15. Each of the four splitters 16 may split its input into two identities with substantially the same power at two respective outputs of said each of the splitters 16.

Figure 1B:
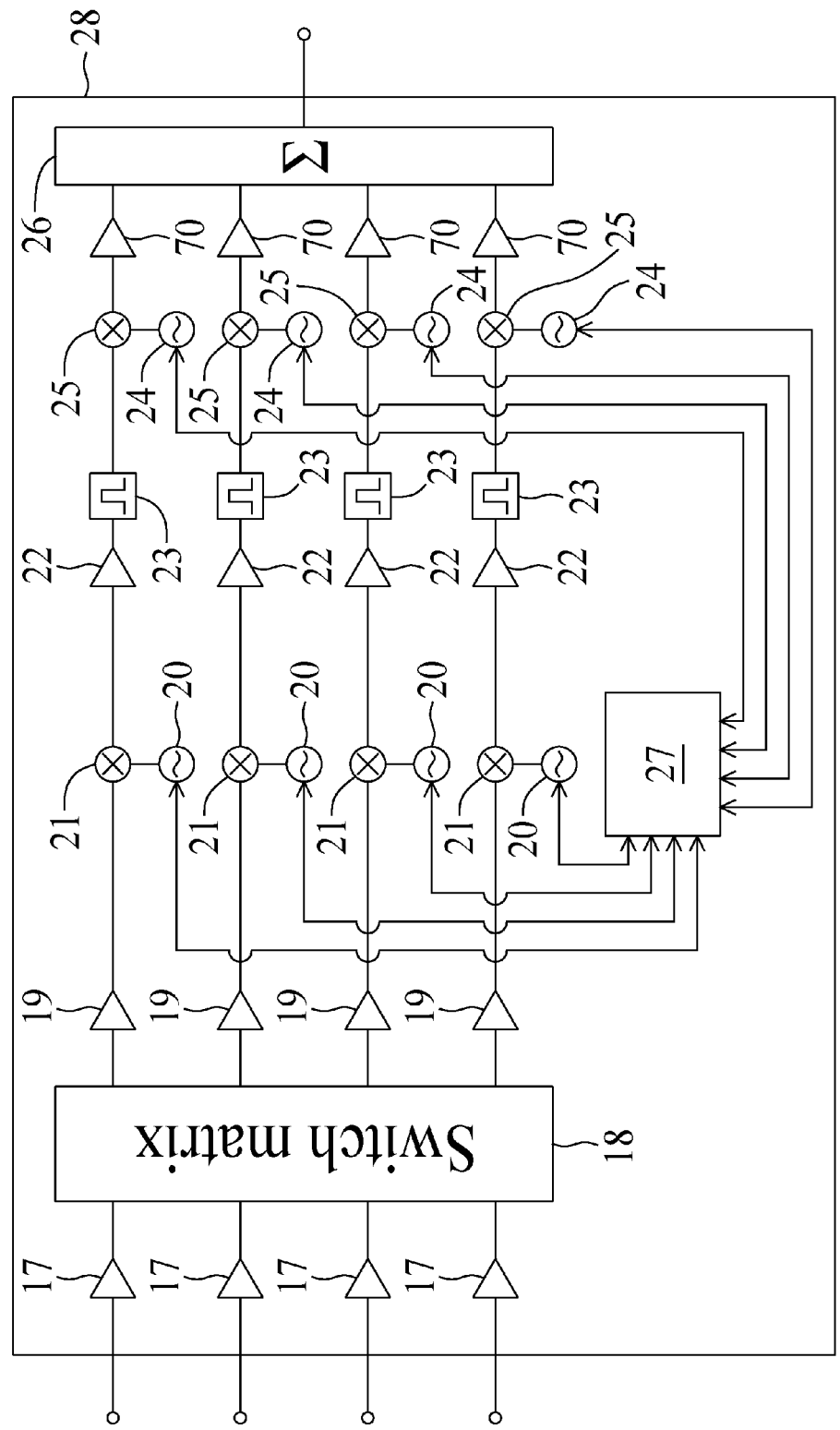
FIGS. 1B and 1C are block diagrams illustrating two different types of single integrated-circuit (IC) chips in accordance with a first embodiment of the present invention.

FIG. 1B is a block diagram illustrating a type of single integrated-circuit (IC) chip in accordance with a first embodiment of the present invention. Referring to FIGS. 1A and 1B, the signal receiver 10 may include a first combination of two single integrated-circuit (IC) chips 28 having the same circuit scheme. Referring to FIG. 1B, each of the two single integrated-circuit (IC) chips 28 has a set of four amplifiers 17, such as single-ended-to-differential amplifiers, arranged in parallel. A topmost one of the four amplifiers 17 in each of the two single integrated-circuit (IC) chips 28 may have a single-ended input coupled to one of the outputs of a topmost one of the splitters 16. A second top one of the four amplifiers 17 in each of the two single integrated-circuit (IC) chips 28 may have a single-ended input coupled to one of the outputs of a second top one of the splitters 16. A second bottom one of the four amplifiers 17 in each of the two single integrated-circuit (IC) chips 28 may have a single-ended input coupled to one of the outputs of a second bottom one of the splitters 16. A bottommost one of the four amplifiers 17 in each of the two single integrated-circuit (IC) chips 28 may have a single-ended input coupled to one of the outputs of a bottommost one of the splitters 16. Each of the eight amplifiers 17 may amplify its single-ended input into its differential output with a phase difference of substantially 180 degrees.

Referring to FIGS. 1A and 1B, each of the two single integrated-circuit (IC) chips 28 may include a switch matrix 18 having four differential inputs each coupled to the differential output of one of the four amplifiers 17 in said each of the two single integrated-circuit (IC) chips 28. The switch matrix 18 may be controlled to switch one of its four differential inputs each having a phase difference of substantially 180 degrees to one of its four differential outputs each having a phase difference of substantially 180 degrees.

Referring to FIGS. 1A and 1B, each of the two single integrated-circuit (IC) chips 28 may include a set of four amplifiers 19, such as differential-to-differential amplifiers, arranged in parallel. In each of the two single integrated-circuit (IC) chips 28, each of the four amplifiers 19 may have a differential input coupled to one of the four differential outputs of the switch matrix 18. Each of the amplifiers 19 may amplify its differential input having a phase difference of substantially 180 degrees into its differential output.

Referring to FIGS. 1A and 1B, each of the two single integrated-circuit (IC) chips 28 may include a set of four synthesizers 20, i.e., local oscillators (LO), each having an oscillating output and a set of four mixers 21 arranged in parallel. In each of the two single integrated-circuit (IC) chips 28, each of the four mixers 21 may have its first input, such as differential input, coupled to the differential output of one of the four amplifiers 19 and its second input coupled to the oscillating output of one of the four synthesizers 20 and mix its first and second inputs into an output such as differential output.

Referring to FIGS. 1A and 1B, each of the two single integrated-circuit (IC) chips 28 may include a set of four amplifiers 22, such as differential-to-differential amplifiers, arranged in parallel. In said each of the two single integrated-circuit (IC) chips 28, each of the four amplifiers 22 may have a differential input coupled to the differential output of one of the mixers 21. Each of the amplifiers 22 may amplify its differential input into a differential output.

Referring to FIGS. 1A and 1B, each of the two single integrated-circuit (IC) chips 28 may include a set of four image rejection filters 23 arranged in parallel. In each of the two single integrated-circuit (IC) chips 28, each of the four image rejection filters 23 may have differential input coupled to the differential output of one of the amplifiers 22. Each of the image rejection filters 23 may suppress image components of its differential input into a differential output.

Referring to FIGS. 1A and 1B, each of the two single integrated-circuit (IC) chips 28 may include a set of four synthesizers 24, i.e., local oscillators (LO), each having an oscillating output and a set of four mixers 25 arranged in parallel. In each of the two single integrated-circuit (IC) chips 28, each of the four mixers 25 may have its first input, such as differential input, coupled to the differential output of one of the four image rejection filters 23 and its second input coupled to the oscillating output of one of the four synthesizers 24 and mix its first and second inputs into a differential output.

Referring to FIGS. 1A and 1B, each of the two single integrated-circuit (IC) chips 28 may include a set of four amplifiers 70, such as differential-to-single-ended amplifiers, arranged in parallel. In each of the two single integrated-circuit (IC) chips 28, each of the four amplifiers 70 may have a differential input coupled to one of the four differential outputs of the mixers 25. Each of the amplifiers 70 may amplify its differential input having a phase difference of substantially 180 degrees into a single-ended output and have an optimum 1 dB compression point (P1 dB) to prevent electronic devices downstream of said each of the amplifiers 70 from being burned out when an excessive power flows through said each of the amplifiers 70.

Referring to FIGS. 1A and 1B, each of the two single integrated-circuit (IC) chips 28 may include an optimization unit 27 coupled to the synthesizers 20 and 24 in said each of the two single integrated-circuit (IC) chips 28. The optimization unit 27 in each of the two single integrated-circuit (IC) chips 28 may compare the frequencies of each two of the oscillating outputs of the eight synthesizers 20 and 24 so as to generate a comparison result. In said each of the two single integrated-circuit (IC) chips 28, when the optimization unit 27 determines the oscillating outputs of two of the eight synthesizers 20 and 24 have an identical frequency or similar frequencies with a difference in a specific range of less than 0.5 MHz and preferably less than 0.25 MHz, for example, in accordance with the comparison result, the optimization unit 27 may adjust a first one of said two of the eight synthesizers 20 and 24 to shift a frequency of its oscillating output with a first certain frequency and adjust a second one of the synthesizers 20 and 24, having its oscillating output mixed into the same signal path as the oscillating output of the first one of said two of the synthesizers 20 and 24 is mixed, to shift a frequency of its oscillating output with a second certain frequency such that the frequencies of the oscillating outputs of each two of the synthesizers 20 and 24 may be adjusted to be different from each other. The first and second certain frequencies may have substantially the same levels in the opposite directions. For example in one of the two single integrated-circuit (IC) chips 28, when the oscillating output of a topmost one of the synthesizers 20 is adjusted by the optimization unit 27 to be shifted with a frequency of +1.0 MHz, a topmost one of the synthesizers 24 may be adjusted by the optimization units 27 to be shifted with a frequency of −1.0 MHz.

Referring to FIGS. 1A and 1B, each of the two single integrated-circuit (IC) chips 28 may include a combiner 26 having its four inputs each coupled to the single-ended output of one of the four amplifiers 70 in said each of the two single integrated-circuit (IC) chips 28 and combine its four inputs into an output.

Accordingly, referring to FIGS. 1A and 1B, the set of four amplifiers 17, the switch matrix 18, the set of four amplifiers 19, the set of four synthesizers 20, the set of four mixers 21, the set of four amplifiers 22, the set of four image rejection filters 23, the set of four synthesizers 24, the set of four mixers 25, the set of four amplifiers 70, the combiner 26 and the optimization unit 27 may be incorporated in the single integrated-circuit (IC) chip 28.

Figure 1C:
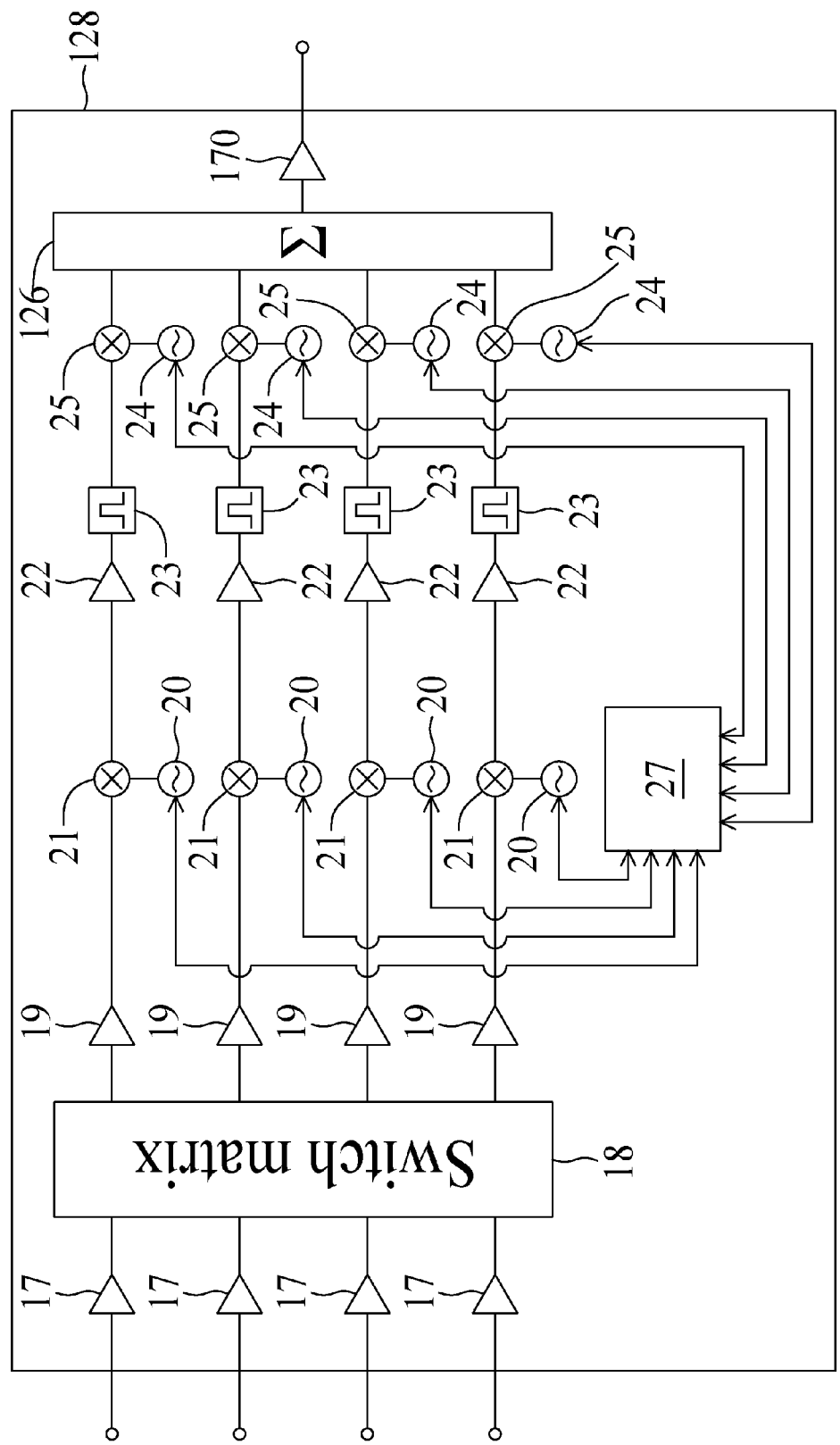

Alternatively, FIG. 1C is a block diagram illustrating another type of single integrated-circuit (IC) chip in accordance with a first embodiment of the present invention. Referring to FIGS. 1A and 1C, the signal receiver 10 may include a second combination of two single integrated-circuit (IC) chips 128 having the same circuit scheme. The single integrated-circuit (IC) chip 128 is similar to the single integrated-circuit (IC) chip 28 as illustrated in FIG. 1B except for the following description. The same reference number illustrated in FIGS. 1B and 1C indicates elements having the same functions. Referring to FIG. 1C, each of the two single integrated-circuit (IC) chips 128 may include a combiner 126 having its four differential inputs each coupled to one of the four differential outputs of the mixers 25 in said each of the two single integrated-circuit (IC) chips 128 and combine its four differential inputs into a differential output.

Referring to FIG. 1C, each of the two single integrated-circuit (IC) chips 128 may include an amplifier 170, such as differential-to-single-ended amplifier. In each of the two single integrated-circuit (IC) chips 128, the amplifier 170 may have a differential input coupled to the differential output of the combiner 126. Each of the amplifiers 170 may amplify its differential input having a phase difference of substantially 180 degrees into a single-ended output and have an optimum 1 dB compression point (P1 dB) to prevent electronic devices downstream of said each of the amplifiers 170 from being burned out when an excessive power flows through said each of the amplifiers 170.

Accordingly, referring to FIG. 1C, the set of four amplifiers 17, the switch matrix 18, the set of four amplifiers 19, the set of four synthesizers 20, the set of four mixers 21, the set of four amplifiers 22, the set of four image rejection filters 23, the set of four synthesizers 24, the set of four mixers 25, the optimization unit 27, the combiner 126 and the amplifier 170, may be incorporated in the single integrated-circuit (IC) chip 128.

Alternatively, referring to FIGS. 1A, 1B and 1C, the signal receiver 10 may include a third combination of the two single integrated-circuit (IC) chips 28 and 128 having different circuit schemes. For example, the single integrated-circuit (IC) chip 28 as seen in FIG. 1B may include the set of four amplifiers 17 each having its input coupled to a top one of the two outputs of one of the four splitters 16, and the single integrated-circuit (IC) chip 128 as seen in FIG. 1C may include the set of four amplifiers 17 each having its input coupled to a bottom one of the two outputs of one of the splitters 16.

Figure 2:
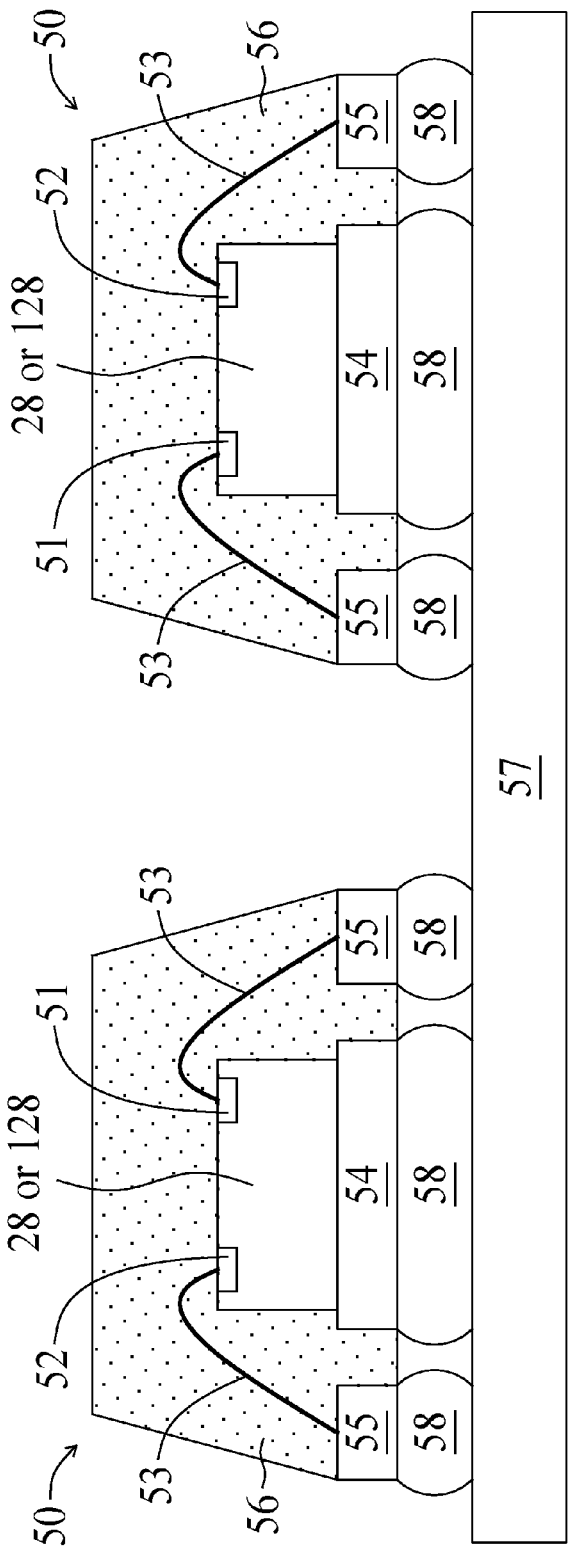
FIG. 2 illustrates packages for two single integrated-circuit (IC) chips in accordance with the first embodiment of the present application.

FIG. 2 illustrates packages for two single integrated-circuit (IC) chips in accordance with the first embodiment of the present application. Referring to FIGS. 1A, 1B, 1C and 2, each of the single integrated-circuit (IC) chips 28 and/or 128 may be packaged into a quad flat no-lead (QFN) package 50 mentioned as below. Each of the single integrated-circuit (IC) chips 28 and/or 128 may have four input metal pads 51 (only one is shown) each coupled to the single-ended input of one of its four amplifiers 17 and an output metal pad 52 coupled to the output of its combiner 26 as shown in FIG. 1B for the single integrated-circuit (IC) chip 28 or to the output of its amplifier 170 as shown in FIG. 1C for the single integrated-circuit (IC) chip 128. The input and output metal pads 51 and 52 may be made of aluminum or cupper at a front side of said each of the single integrated-circuit (IC) chips 28 and/or 128. Each of the two quad flat no-lead (QFN) packages 50 includes one of the single integrated-circuit (IC) chips 28 and 128, a die pad 54 having said one of the single integrated-circuit (IC) chips 28 and 128 mounted to a front side thereof and multiple metal pads 55 surrounding the die pad 54 in a plane, multiple wires 53 made of gold or cupper each having an end wirebonded to a front side of one of the metal pads 55 and the other end wirebonded to one of the input and output metal pads 51 and 52 of said one of the single integrated-circuit (IC) chips 28 and 128 and a polymer compound 56 encapsulating the wires 53, the metal pads 55 and said one of the single integrated-circuit (IC) chips 28 and 128.

Referring to FIGS. 1A, 1B, 1C and 2, a carrier 57, such as printed circuit board or ceramic substrate, may be provided to have the two quad flat no-lead (QFN) packages 50 mounted thereto via a tin-containing solder 58. The tin-containing solder 58 may join back sides of the die pads 54 to the carrier 57 and join back sides of the metal pads 55 to the carrier 57. The two multi-stage amplifiers 11, two splitters 12, four band-pass filters (BPF) 13, two synthesizers 14 and four mixers 15 in the radio-frequency (RF) module 30 may be incorporated into another single integrated-circuit (IC) chip (not shown), which may be packaged to be mounted to the carrier 57, or may be discretely mounted to the carrier 57. The four splitters 16 in the splitter matrix 40 may be incorporated into another single integrated-circuit (IC) chip (not shown), which may be packaged to be mounted to the carrier 57, or may be discretely mounted to the carrier 57.

Figure 3:
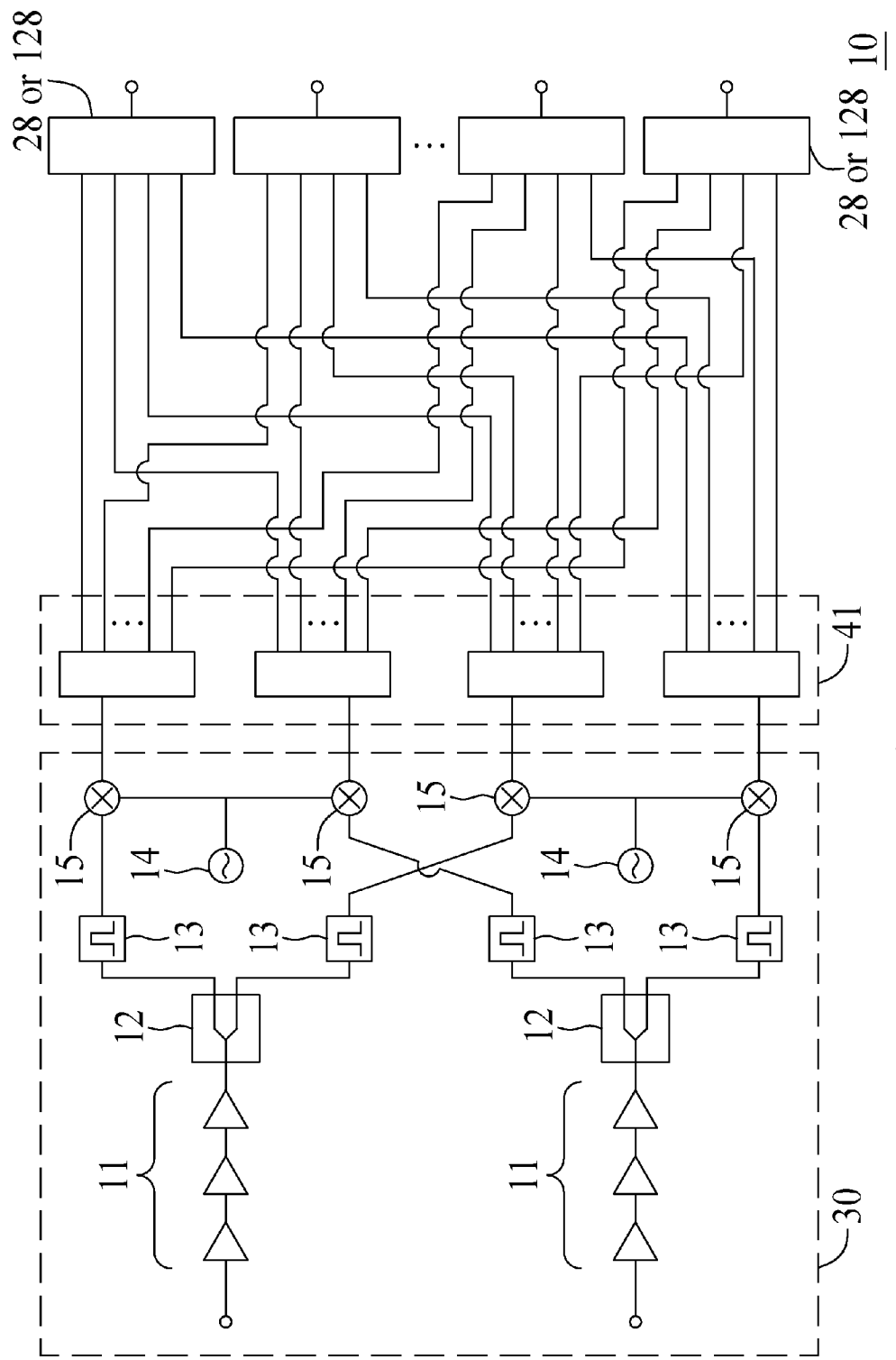
FIG. 3 illustrates a block diagram of a signal receiver in accordance with the first embodiment of the present invention.

FIG. 3 illustrates a block diagram of a signal receiver in accordance with the first embodiment of the present invention. The same reference number illustrated in FIGS. 1A, 1B and 3 indicates elements having the same functions. In FIGS. 1A and 1B, the output of each of the mixers 15 in the radio-frequency (RF) module 30 is split by the splitter matrix 40 into two identities with substantially the same power. Alternatively, referring to FIG. 3, the output of each of the mixers 15 in the radio-frequency (RF) module 30 may be split by another splitter matrix 41 into any number of identities, such as four ones, with substantially the same power. The number of a fourth combination of the single integrated-circuit (IC) chips 28 and 128, such as four ones, may be provided each including the four amplifiers 17 having four respective inputs associated with the outputs of the four respective mixers 15 via connection of the splitter matrix 41. The fourth combination may include a single type of the single integrated-circuit (IC) chips 28, each of which is provided with the combiner 26 configured to generate its output as an output of said each of the single integrated-circuit (IC) chips 28. Alternatively, the fourth combination may include a single type of the single integrated-circuit (IC) chips 128, each of which is provided with the amplifier 170 configured to generate its output as an output of said each of the single integrated-circuit (IC) chips 128. Alternatively, the fourth combination may include one or more of the single integrated-circuit (IC) chips 28 that is provided with the combiner 26 configured to generate its output as an output of said one or more of the single integrated-circuit (IC) chips 28 and one or more of the single integrated-circuit (IC) chips 128 that is provided with the amplifier 170 configured to generate its output as an output of said one or more of the single integrated-circuit (IC) chips 128.

Figure 4:
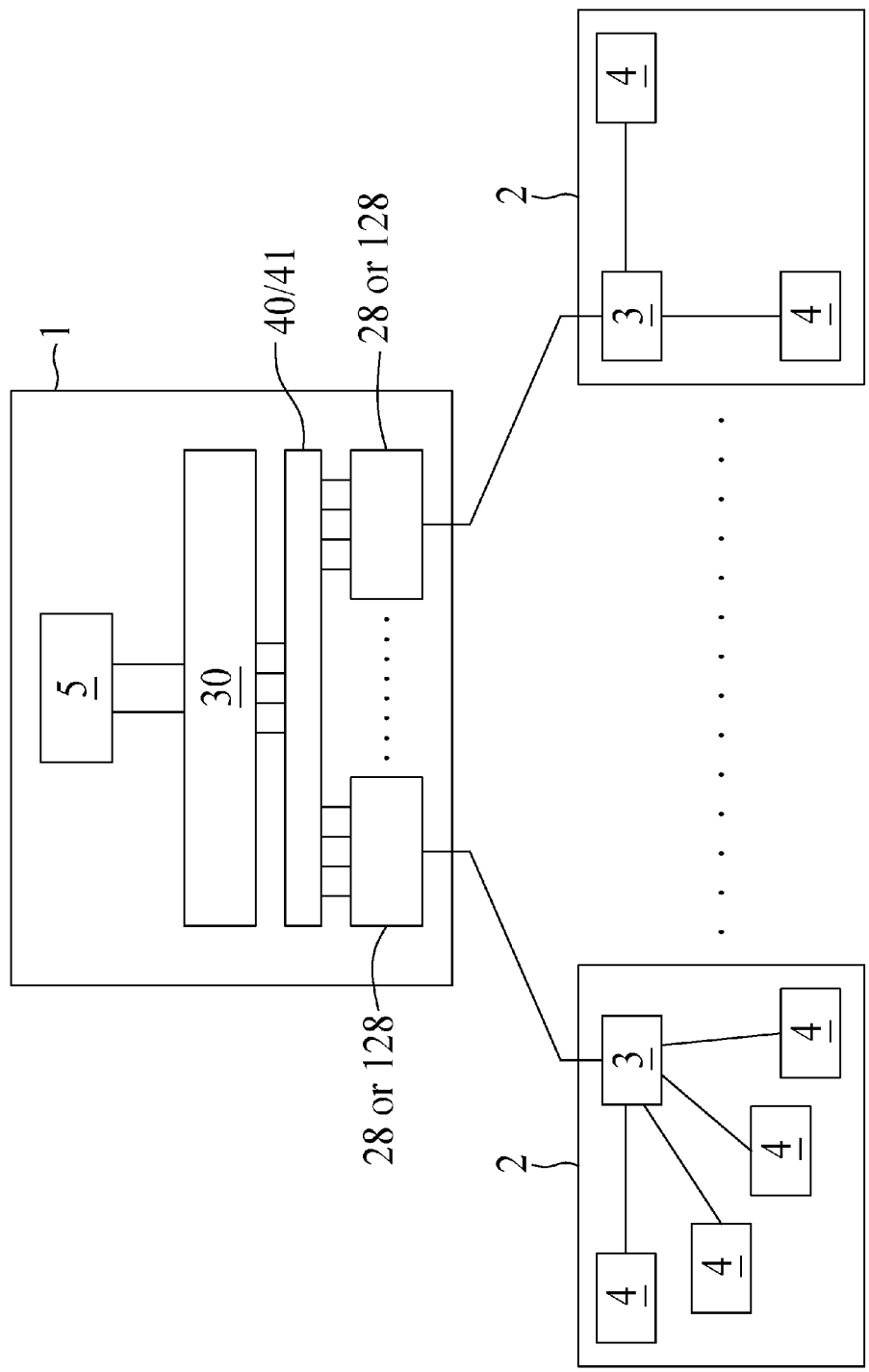
FIG. 4 illustrates a block diagram of a signal receiver set in an outdoor unit to work with multiple indoor units in accordance with the first embodiment of the present invention.

FIG. 4 illustrates a block diagram of a signal receiver set in an outdoor unit to work with multiple indoor units in accordance with the first embodiment of the present invention. Referring to FIG. 4, the signal receiver as illustrated in FIG. 1A, 1B, 1C or 3 may be set in an outdoor unit 1 to have the two sets of multi-stage amplifiers 11 in the radio-frequency (RF) module 30 with their two inputs associated respectively with vertically and horizontally polarized signals collected by the antenna feed horn 5 of the outdoor unit 1 or associated respectively with left-hand and right-hand circularly polarized signals collected by the antenna feed horn 5 of the outdoor unit 1. The combiner 26 incorporated in each of the single integrated-circuit (IC) chips 28 or the amplifier 170 incorporated in each of the single integrated-circuit (IC) chips 128 may generate its output as an output of the outdoor unit 1 to be coupled to one of indoor units 2. Each of the indoor units 2 may include a splitter 3, i.e. power divider, to split its input associated with the output of the combiner 26 incorporated in one of the single integrated-circuit (IC) chips 28 or the output of the amplifier 170 incorporated in one of the single integrated-circuit (IC) chips 128 into multiple identities with substantially the same power at multiple respective outputs of the splitter 3 and multiple setup boxes 4 each having an input coupled to one of the outputs of the splitter 3 to demodulate its input into an output. Alternatively, if one of the indoor units 2 has only one setup box 4, the splitter 3 may be omitted in said one of the indoor units 2 and the only one setup box 4 has an input associated with an output of the combiner 26 incorporated in one of the single integrated-circuit (IC) chips 28 or an output of the amplifier 170 incorporated in one of the single integrated-circuit (IC) chips 128.

Figure 5:
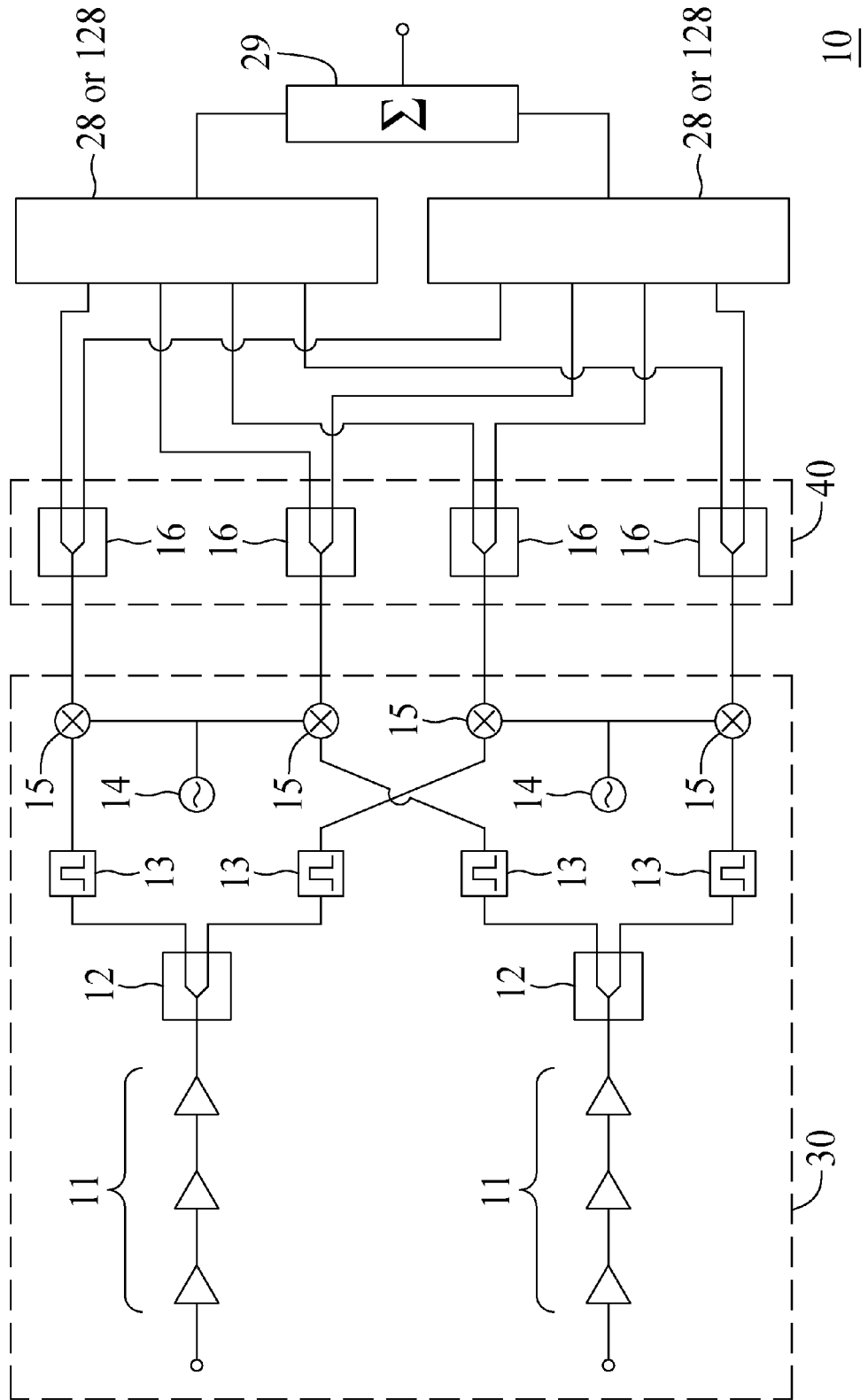
FIG. 5 illustrates a block diagram of a signal receiver in accordance with the first embodiment of the present invention.
Figure 6:
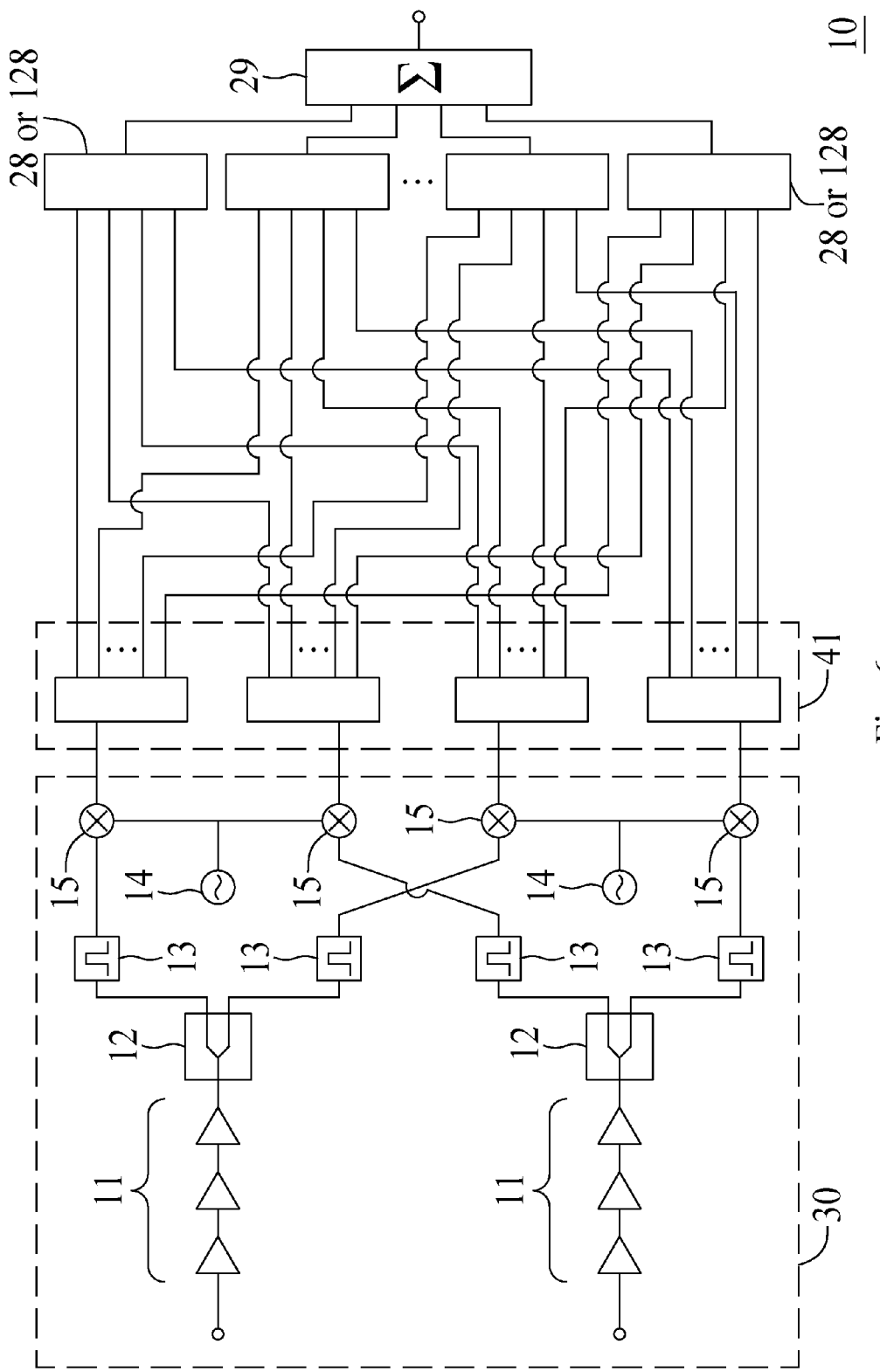
FIG. 6 illustrates a block diagram of a signal receiver in accordance with the first embodiment of the present invention.

FIG. 5 illustrates a block diagram of a signal receiver in accordance with the first embodiment of the present invention. FIG. 6 illustrates a block diagram of a signal receiver in accordance with the first embodiment of the present invention. The same reference number illustrated in FIGS. 1A, 1B, 3, 5 and 6 indicates elements having the same functions. Referring to FIG. 5, the signal receiver 10 may further include a combiner 29 having its multiple inputs each coupled to the output of one of the combiners 26 of the single integrated-circuit (IC) chips 28 in the first, second or third combination or the output of one of the amplifiers 170 of the single integrated-circuit (IC) chips 128 in the first, second and third combination and combine its multiple inputs into an output. Referring to FIG. 6, the signal receiver 10 may further include a combiner 29 having its multiple inputs each coupled to the output of one of the combiners 26 of the single integrated-circuit (IC) chips 28 in the fourth combination or the output of one of the amplifiers 170 of the single integrated-circuit (IC) chips 128 in the fourth combination and combine its multiple inputs into an output.

Second Embodiment

Figure 7:
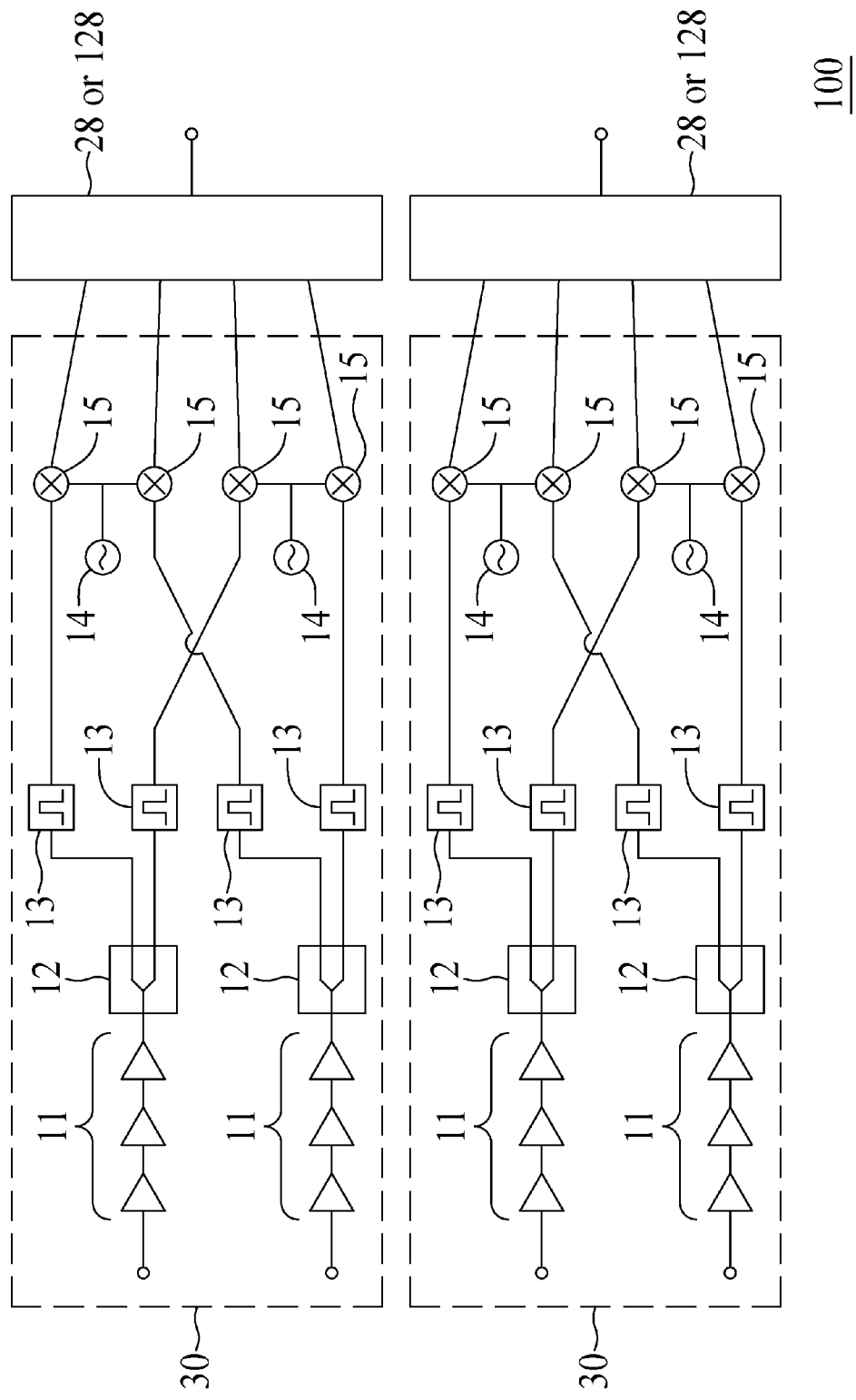
FIG. 7 illustrates a block diagram of a signal receiver in accordance with a second embodiment of the present invention.

FIG. 7 illustrates a block diagram of a signal receiver in accordance with a second embodiment of the present invention. The same reference number illustrated in FIGS. 1A, 1B, 1C and 7 indicates elements having the same functions.

Alternatively, referring to FIGS. 1A, 1B, 1C and 7, the splitter matrix 40 illustrated in FIG. 1A may be omitted, but the radio-frequency module 30 illustrated in FIG. 1A may be doubled to be arranged in parallel to work with a fifth combination of the two single integrated-circuit (IC) chips 28 and/or 128 arranged in parallel respectively. The fifth combination may include the two single integrated-circuit (IC) chips 28 arranged in parallel to each other and with the same circuit structure as the single integrated-circuit (IC) chip 28 as shown in FIG. 1B. Alternatively, the fifth combination may include the two single integrated-circuit (IC) chips 128 arranged in parallel to each other and with the same circuit structure as the single integrated-circuit (IC) chip 128 as shown in FIG. 1C. Alternatively, the fifth combination may include the single integrated-circuit (IC) chips 28 and 128 arranged in parallel to each other. Referring to FIG. 7, with regard to the second embodiment, a signal receiver 100 is provided with the two radio-frequency modules 30 coupled in series to the fifth combination of the two single integrated-circuit (IC) chips 28 and/or 128 respectively. Each of the two radio-frequency modules 30 may process vertically and horizontally polarized signals or right-hand and left-hand circularly polarized signals, collected by one of antenna feed horns of the signal receiver 10 at a focal point of an antenna dish or reflector dish of the outdoor unit, from multiple satellites in a field of view of the signal receiver 100. For example, a vertically polarized signal collected from one of the antenna feed horns may be transmitted to the input of a top one of the two sets of multi-stage amplifiers 11 in a top one of the radio-frequency modules 30, and a horizontally polarized signal collected from said one of the antenna feed horns may be transmitted to the input of a bottom one of the two sets of multi-stage amplifiers 11 in the top one of the radio-frequency modules 30; another vertically polarized signal collected from another one of the antenna feed horns may be transmitted to the input of a top one of the two sets of multi-stage amplifiers 11 in a bottom one of the radio-frequency modules 30, and another horizontally polarized signal collected from said another one of the antenna feed horns may be transmitted to the input of a bottom one of the two sets of multi-stage amplifiers 11 in the bottom one of the radio-frequency modules 30. Alternatively, a left-hand circularly polarized signal collected from one of the antenna feed horns may be transmitted to the input of a top one of the two sets of multi-stage amplifiers 11 in a top one of the radio-frequency modules 30, and a right-hand circularly polarized signal collected from said one of the antenna feed horns may be transmitted to the input of a bottom one of the two sets of multi-stage amplifiers 11 in the top one of the radio-frequency modules 30; another left-hand circularly polarized signal collected from another one of the antenna feed horns may be transmitted to the input of a top one of the two sets of multi-stage amplifiers 11 in a bottom one of the radio-frequency modules 30, and another right-hand circularly polarized signal collected from said another one of the antenna feed horns may be transmitted to the input of a bottom one of the two sets of multi-stage amplifiers 11 in the bottom one of the radio-frequency modules 30. Alternatively, a vertically polarized signal collected from one of the antenna feed horns may be transmitted to the input of a top one of the two sets of multi-stage amplifiers 11 in a top one of the radio-frequency modules 30, and a horizontally polarized signal collected from said one of the antenna feed horns may be transmitted to the input of a bottom one of the two sets of multi-stage amplifiers 11 in the top one of the radio-frequency modules 30; a left-hand circularly polarized signal collected from another one of the antenna feed horns may be transmitted to the input of a top one of the two sets of multi-stage amplifiers 11 in a bottom one of the radio-frequency modules 30, and a right-hand circularly polarized signal collected from said another one of the antenna feed horns may be transmitted to the input of a bottom one of the two sets of multi-stage amplifiers 11 in the bottom one of the radio-frequency modules 30.

Referring to FIGS. 1B, 1C and 7, each of the four amplifiers 17 in a top one of the single integrated-circuit (IC) chips 28 and/or 128 in the fifth combination may have its single-ended input coupled to the output of one of the four mixers 15 in a top one of the two radio-frequency modules 30, and each of the four amplifiers 17 in a bottom one of the single integrated-circuit (IC) chips 28 and/or 128 in the fifth combination may have its single-ended input coupled to the output of one of the four mixers 15 in a bottom one of the two radio-frequency modules 30.

Figure 8:
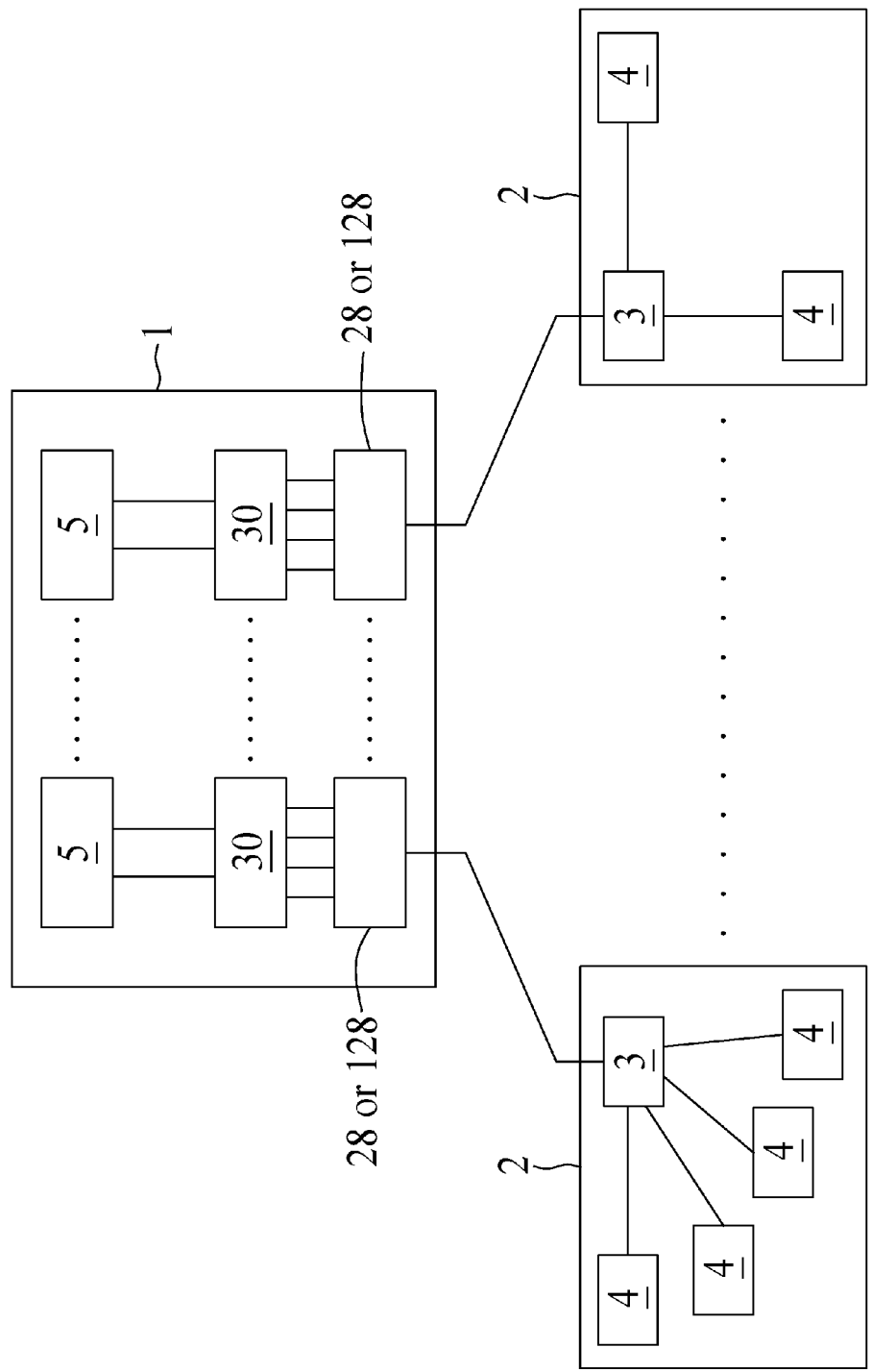
FIG. 8 illustrates a block diagram of a signal receiver set in an outdoor unit to work with multiple indoor units in accordance with the second embodiment of the present invention.

FIG. 8 illustrates a block diagram of a signal receiver set in an outdoor unit to work with multiple indoor units in accordance with the second embodiment of the present invention. Referring to FIG. 8, the outdoor unit may include the radio-frequency modules 30 arranged in parallel with the number greater than or equal to two, such as four, and a sixth combination of the single integrated-circuit (IC) chips 28 and/or 128 arranged in parallel with the number greater than or equal to two, such as four, wherein the radio-frequency modules 30 may be coupled in series to the sixth combination of the single integrated-circuit (IC) chips 28 and 128 respectively. The sixth combination may include a single type of the single integrated-circuit (IC) chips 28 as seen in FIG. 1B, each of which is provided with the combiner 26 configured to generate its output as an output of said each of the single integrated-circuit (IC) chips 28. Alternatively, the sixth combination may include a single type of the single integrated-circuit (IC) chips 128 as seen in FIG. 1C, each of which is provided with the amplifier 170 configured to generate its output as an output of said each of the single integrated-circuit (IC) chips 128. Alternatively, the sixth combination may include one or more of the single integrated-circuit (IC) chips 28 as seen in FIG. 1B that is provided with the combiner 26 configured to generate its output as an output of said one or more of the single integrated-circuit (IC) chips 28 and one or more of the single integrated-circuit (IC) chips 128 as seen in FIG. 1C that is provided with the amplifier 170 configured to generate its output as an output of said one or more of the single integrated-circuit (IC) chips 128. Each of the radio-frequency modules 30 may have the two sets of multi-stage amplifiers 11 to process vertically and horizontally polarized signals respectively or right-hand and left-hand circularly polarized signals respectively, collected by one of antenna feed horns 5 of the signal receiver 10 at a focal point of an antenna dish or reflector dish of the outdoor unit, from multiple satellites in a field of view of the signal receiver 100. Each of the indoor units 2 may include a splitter 3, i.e. power divider, to split its input associated with the output of the combiner 26 incorporated in one of the single integrated-circuit (IC) chips 28 or the output of the amplifier 170 incorporated in one of the single integrated-circuit (IC) chips 128 into multiple identities with substantially the same power at multiple respective outputs of the splitter 3 and multiple setup boxes 4 each having an input coupled to one of the outputs of the splitter 3 to demodulate its input into an output. Alternatively, if one of the indoor units 2 has only one setup box 4, the splitter 3 may be omitted in said one of the indoor units 2 and the only one setup box 4 has an input associated with the output of the combiner 26 incorporated in one of the single integrated-circuit (IC) chips 28 or the output of the amplifier 170 incorporated in one of the single integrated-circuit (IC) chips 128.

Figure 9:
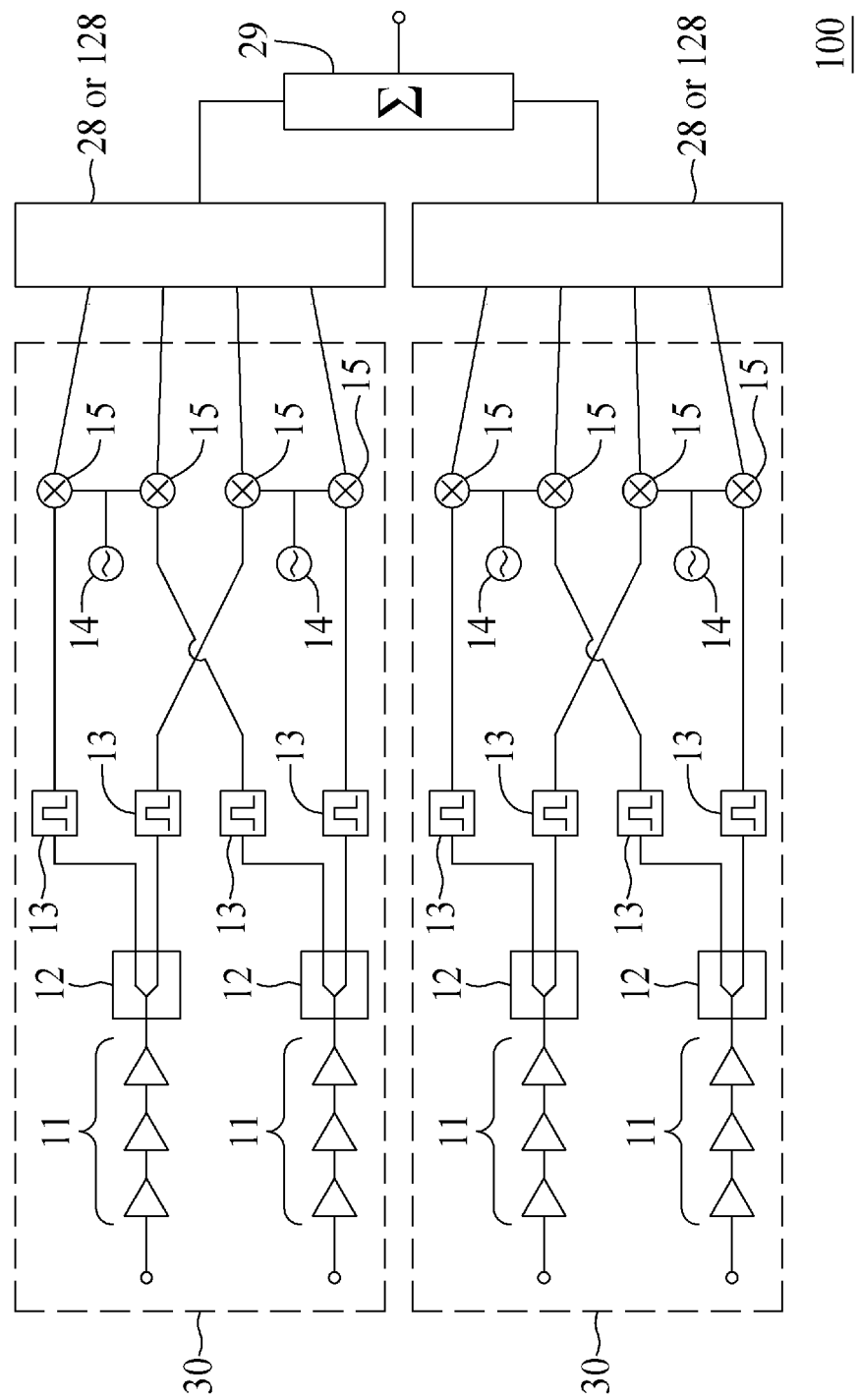
FIG. 9 illustrates a block diagram of a signal receiver in accordance with the second embodiment of the present invention.

FIG. 9 illustrates a block diagram of a signal receiver in accordance with the second embodiment of the present invention. The same reference number illustrated in FIGS. 1A, 1B, 1C, 7 and 9 indicates elements having the same functions. Referring to FIG. 9, the signal receiver 100 may further include a combiner 29 having its multiple inputs each coupled to the output of one of the combiners 26 of the single integrated-circuit (IC) chips 28 in the fifth combination or the output of one of the amplifiers 170 of the single integrated-circuit (IC) chips 128 in the fifth combination and combine its multiple inputs into an output.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A signal receiver comprising
   a first synthesizer configured to generate an oscillating output;
   a first mixer configured to mix its first input with its second input associated with said oscillating output of said first synthesizer into an output;
   a first splitter configured to split its input associated with said output of said first mixer into a first output and a second output;
   a first switch matrix configured to switch its first input associated with said first output of said first splitter into a first output;
   a second switch matrix configured to switch its first input associated with said second output of said first splitter into a first output;
   a second synthesizer configured to generate an oscillating output;
   a second mixer configured to mix its first input associated with said first output of said first switch matrix with its second input associated with said oscillating output of said second synthesizer into an output;
   a third synthesizer configured to generate an oscillating output; and a third mixer configured to mix its first input associated with said first output of said second switch matrix with its second input associated with said oscillating output of said third synthesizer into an output.

2. The signal receiver of claim 1, wherein said first switch matrix, second synthesizer and second mixer are incorporated in a single integrated-circuit (IC) chip, and said second switch matrix, third synthesizer and third mixer are incorporated in another single integrated-circuit (IC) chip.

3. The signal receiver of claim 1 further comprising a fourth mixer configured to mix its first input with its second input associated with said oscillating output of said first synthesizer into an output, a second splitter configured to split its input associated with said output of said fourth mixer into a first output and a second output, wherein said first switch matrix is configured to switch its second input associated with said first output of said second splitter into a second output, wherein said second switch matrix is configured to switch its second input associated with said second output of said second splitter into a second output, a fourth synthesizer configured to generate an oscillating output, a fifth mixer configured to mix its first input associated with said second output of said first switch matrix with its second input associated with said oscillating output of said fourth synthesizer into an output, a fifth synthesizer configured to generate an oscillating output, a sixth mixer configured to mix its first input associated with said second output of said second switch matrix with its second input associated with said oscillating output of said fifth synthesizer into an output, a first combiner configured to combine its first input associated with said output of said second mixer and its second input associated with said output of said fifth mixer into an output and a second combiner configured to combine its first input associated with said output of said third mixer and its second input associated with said output of said sixth mixer into an output.

4. The signal receiver of claim 3, wherein said first switch matrix, second and fourth synthesizers, second and fifth mixers and first combiner are incorporated in a single integrated-circuit (IC) chip, and said second switch matrix, third and fifth synthesizers, third and sixth mixers and second combiner are incorporated in another single integrated-circuit (IC) chip.

5. The signal receiver of claim 3 further comprising a first image rejection filter configured to suppress an image component of its input associated with said output of said second mixer into an output, a second image rejection filter configured to suppress an image component of its input associated with said output of said third mixer into an output, a third image rejection filter configured to suppress an image component of its input associated with said output of said fifth mixer into an output, a fourth image rejection filter configured to suppress an image component of its input associated with said output of said sixth mixer into an output, a sixth synthesizer configured to generate an oscillating output, a seventh mixer configured to mix its first input associated with said output of said first image rejection filter with its second input associated with said oscillating output of said sixth synthesizer into an output, a seventh synthesizer configured to generate an oscillating output, an eighth mixer configured to mix its first input associated with said output of said second image rejection filter with its second input associated with said oscillating output of said seventh synthesizer into an output, an eighth synthesizer configured to generate an oscillating output, a ninth mixer configured to mix its first input associated with said output of said third image rejection filter with its second input associated with said oscillating output of said eighth synthesizer into an output, a ninth synthesizer configured to generate an oscillating output and a tenth mixer configured to mix its first input associated with said output of said fourth image rejection filter with its second input associated with said oscillating output of said ninth synthesizer into an output, wherein said first input of said first combiner is associated with said output of said seventh mixer and said second input of said first combiner is associated with said output of said ninth mixer, wherein said first input of said second combiner is associated with said output of said eighth mixer and said second input of said second combiner is associated with said output of said tenth mixer.

6. The signal receiver of claim 5, wherein said first switch matrix, second, fourth, sixth and eighth synthesizers and second, fifth, seventh and ninth mixers and first combiner are incorporated in a single integrated-circuit (IC) chip, and said second switch matrix, third, fifth, seventh and ninth synthesizers, third, sixth, eighth and tenth mixers and second combiner are incorporated in another single integrated-circuit (IC) chip.

7. The signal receiver of claim 1 further comprising a fourth synthesizer configured to generate an oscillating output, a fourth mixer configured to mix its first input with its second input associated with said oscillating output of said fourth synthesizer into an output, a second splitter configured to split its input associated with said output of said fourth mixer into a first output and a second output, wherein said first switch matrix is configured to switch its second input associated with said first output of said second splitter into a second output, wherein said second switch matrix is configured to switch its second input associated with said second output of said second splitter into a second output, a fifth synthesizer configured to generate an oscillating output, a fifth mixer configured to mix its first input associated with said second output of said first switch matrix with its second input associated with said oscillating output of said fifth synthesizer into an output, a sixth synthesizer configured to generate an oscillating output, a sixth mixer configured to mix its first input associated with said second output of said second switch matrix with its second input associated with said oscillating output of said sixth synthesizer into an output, a first combiner configured to combine its first input associated with said output of said second mixer and its second input associated with said output of said fifth mixer into an output and a second combiner configured to combine its first input associated with said output of said third mixer and its second input associated with said output of said sixth mixer into an output.

8. The signal receiver of claim 7, wherein said first switch matrix, second and fifth synthesizers, second and fifth mixers and first combiner are incorporated in a single integrated-circuit (IC) chip, and said second switch matrix, third and sixth synthesizers, third and sixth mixers and second combiner are incorporated in another single integrated-circuit (IC) chip.

9. The signal receiver of claim 7 further comprising a third combiner configured to combine its first input associated with said output of said first combiner and its second input associated with said output of said second combiner into an output.

10. The signal receiver of claim 1 further comprising a first image rejection filter configured to suppress an image component of its input associated with said output of said second mixer into an output, a second image rejection filter configured to suppress an image component of its input associated with said output of said third mixer into an output, a fourth synthesizer configured to generate an oscillating output, a fourth mixer configured to mix its first input associated with said output of said first image rejection filter with its second input associated with said oscillating output of said fourth synthesizer into an output, a fifth synthesizer configured to generate an oscillating output, a fifth mixer configured to mix its first input associated with said output of said second image rejection filter with its second input associated with said oscillating output of said fifth synthesizer into an output, a first combiner configured to combine its first input associated with said output of said second mixer and its second input into an output and a second combiner configured to combine its first input associated with said output of said third mixer and its second input into an output.

11. The signal receiver of claim 10, wherein said first switch matrix, second and fourth synthesizers, second and fourth mixers and first combiner are incorporated in a single integrated-circuit (IC) chip, and said second switch matrix, third and fifth synthesizers, third and fifth mixers and second combiner are incorporated in another single integrated-circuit (IC) chip.

12. The signal receiver of claim 10, wherein said oscillating output of said second synthesizer and said oscillating output of said fourth synthesizer are configured to be adjusted based on information containing said oscillating output of said second synthesizer.

13. The signal receiver of claim 10 further comprising an optimization unit configured to adjust said oscillating output of said second synthesizer with a first frequency and adjust said oscillating output of said fourth synthesizer with a second frequency, wherein said first and second frequencies have substantially the same level in the opposite directions.

14. The signal receiver of claim 1 configured to be set in an outdoor unit to receive a satellite signal reflected by an antenna dish, wherein said first input of said first mixer is associated with said satellite signal.

15. A single integrated-circuit (IC) chip comprising:
a switch matrix configured to switch its first input into a first output and switch its second input into a second output;
a first synthesizer configured to generate an oscillating output;
a first mixer configured to mix its first input associated with said first output of said switch matrix with its second input associated with said oscillating output of said first synthesizer into an output;
a second synthesizer configured to generate an oscillating output;
a second mixer configured to mix its first input associated with said second output of said switch matrix with its second input associated with said oscillating output of said second synthesizer into an output;
a first filter configured to suppress a component of its input associated with said output of said first mixer into an output;
a second filter configured to suppress a component of its input associated with said output of said second mixer into an output;
a third synthesizer configured to generate an oscillating output;
a third mixer configured to mix its first input associated with said output of said first image rejection filter with its second input associated with said oscillating output of said third synthesizer into an output;
a fourth synthesizer configured to generate an oscillating output;
a fourth mixer configured to mix its first input associated with said output of said second image rejection filter with its second input associated with said oscillating output of said fourth synthesizer into an output; and
a combiner configured to combine its first input associated with said output of said third mixer and its second input associated with said output of said fourth mixer into an output.

16. The single integrated-circuit (IC) chip of claim 15 configured to be set in an outdoor unit to receive a satellite signal reflected by an antenna dish.

17. The single integrated-circuit (IC) chip of claim 15 further comprising an optimization unit configured to adjust said oscillating output of said first synthesizer with a first frequency and adjust said oscillating output of said third synthesizer with a second frequency, wherein said first and second frequencies have substantially the same level in the opposite directions.

18. The single integrated-circuit (IC) chip of claim 15 further comprising a first single-ended-to-differential amplifier configured to amplify its single-ended input into a differential output with a phase difference of substantially 180 degrees, a second single-ended-to-differential amplifier configured to amplify its single-ended input into a differential output with a phase difference of substantially 180 degrees, wherein said first input of said switch matrix comprises a differential input associated with said differential output of said first single-ended-to-differential amplifier, wherein said second input of said switch matrix comprises a differential input associated with said differential output of said second single-ended-to-differential amplifier, wherein said first output of said switch matrix comprises a differential output with a phase difference of substantially 180 degrees, wherein said second output of said switch matrix comprises a differential output with a phase difference of substantially 180 degrees, a first differential-to-differential amplifier configured to amplify its differential input associated with said first output of said switch matrix into its differential output and a second differential-to-differential amplifier configured to amplify its differential input associated with said second output of said switch matrix into its differential output, wherein said first input of said first mixer is associated with said differential output of said first differential-to-differential amplifier, wherein said first input of said second mixer is associated with said differential output of said second differential-to-differential amplifier.

19. A signal receiver comprising
a first switch matrix configured to switch its first input into a first output and switch its second input into a second output;
a first synthesizer configured to generate an oscillating output;
a first mixer configured to mix its first input associated with said first output of said first switch matrix with its second input associated with said oscillating output of said first synthesizer into an output;
a second synthesizer configured to generate an oscillating output;
a second mixer configured to mix its first input associated with said second output of said first switch matrix with its second input associated with said oscillating output of said second synthesizer into an output;
a first combiner configured to combine its first input associated with said output of said first mixer and its second input associated with said output of said second mixer into an output;

a second switch matrix configured to switch its first input into a first output and switch its second input into a second output;
a third synthesizer configured to generate an oscillating output;
a third mixer configured to mix its first input associated with said first output of said second switch matrix with its second input associated with said oscillating output of said third synthesizer into an output;
a fourth synthesizer configured to generate an oscillating output;
a fourth mixer configured to mix its first input associated with said second output of said second switch matrix with its second input associated with said oscillating output of said fourth synthesizer into an output;
a second combiner configured to combine its first input associated with said output of said third mixer and its second input associated with said output of said fourth mixer into an output; and
a third combiner configured to combine its first input associated with said output of said first combiner and its second input associated with said output of said second combiner into an output.

20. The signal receiver of claim 19, wherein said first switch matrix, first and second synthesizers and first and second mixers are incorporated in a single integrated-circuit (IC) chip, and said second switch matrix, third and fourth synthesizers and third and fourth mixers are incorporated in another single integrated-circuit (IC) chip.

* * * * *